United States Patent
Hoshiya et al.

(10) Patent No.: US 9,036,307 B1
(45) Date of Patent: May 19, 2015

(54) HEAT-ASSISTED MAGNETIC RECORDING (HAMR) WRITE HEAD WITH RECESSED NEAR-FIELD TRANSDUCER AND OPTICALLY TRANSPARENT PROTECTIVE FILM

(71) Applicant: HGST Netherlands B.V., Amsterdam (NL)

(72) Inventors: Hiroyuki Hoshiya, Odawara (JP); Tomomitsu Inoue, Odawara (JP); Tetsuya Matsusaki, Odawara (JP); Harukazu Miyamoto, Higashimurayama (JP); Kazuhito Miyata, Fujisawa (JP); Kentaro Namikawa, Odawara (JP); Atsuko Okawa, Yokohama (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/510,377

(22) Filed: Oct. 9, 2014

(51) Int. Cl.
  *G11B 5/02* (2006.01)
  *G11B 5/33* (2006.01)
  *G11B 5/39* (2006.01)

(52) U.S. Cl.
  CPC .......... *G11B 5/3903* (2013.01); *G11B 2220/90* (2013.01)

(58) Field of Classification Search
  CPC ..................... G11B 5/3903; G11B 2005/0021; G11B 2005/0005; G11B 5/314
  USPC ............. 360/59, 313, 125.3, 234.5, 128, 122; 369/13.13; 29/603.01
  See application file for complete search history.

(56) References Cited

U.S. PATENT DOCUMENTS

| | | | |
|---|---|---|---|
| 5,792,546 A * | 8/1998 | Kanamine et al. | 428/212 |
| 6,524,687 B2 | 2/2003 | Horng et al. | |
| 7,508,632 B2 | 3/2009 | Li et al. | |
| 7,518,815 B2 | 4/2009 | Rottmayer et al. | |
| 8,194,512 B2 | 6/2012 | Stipe | |
| 8,705,325 B2 | 4/2014 | Matsumoto | |
| 8,705,327 B2 | 4/2014 | Matsumoto | |
| 2003/0228497 A1 | 12/2003 | Howard et al. | |
| 2011/0096639 A1 | 4/2011 | Matsumoto | |
| 2011/0170381 A1 | 7/2011 | Matsumoto | |

\* cited by examiner

*Primary Examiner* — Nabil Hindi
(74) *Attorney, Agent, or Firm* — Thomas R. Berthold

(57) ABSTRACT

A heat-assisted magnetic recording (HAMR) air-bearing slider has an optically-transparent protective film over the near-field transducer (NFT) to protect the NFT from excessive heat caused by the accumulation of carbonaceous material on the slider's overcoat. The NFT is thus separated from the overcoat by the protective film. The protective film does not cover the write pole end, which is covered only by the overcoat, so there is no spacing loss between the write pole end and the recording layer on the disk. In one embodiment the protective film is coplanar with the recording-layer-facing surface of the slider and the overcoat covers both the protective film and the write pole end. In another embodiment the overcoat has a window that surrounds the protective film, with the protective film being substantially coplanar with the air-bearing surface (ABS) of the slider. In both embodiments the smooth topography of the slider's ABS is maintained.

19 Claims, 11 Drawing Sheets

HEAT-ASSISTED MAGNETIC RECORDING (HAMR) WRITE HEAD WITH RECESSED NEAR-FIELD TRANSDUCER AND OPTICALLY TRANSPARENT PROTECTIVE FILM

TECHNICAL FIELD

This invention relates generally to a heat-assisted magnetic recording (HAMR) disk drive, in which data are written while the magnetic recording layer on the disk is at an elevated temperature, and more specifically to an improved HAMR write head.

BACKGROUND OF THE INVENTION

In conventional magnetic recording, thermal instabilities of the stored magnetization in the recording media can cause loss of recorded data. To avoid this, media with high magneto-crystalline anisotropy ($K_u$) are required. However, increasing $K_u$ also increases the coercivity of the media, which can exceed the write field capability of the write head. Since it is known that the coercivity of the magnetic material of the recording layer is temperature dependent, one proposed solution to the thermal stability problem is heat-assisted magnetic recording (HAMR), wherein high-$K_u$ magnetic recording material is heated locally during writing to lower the coercivity enough for writing to occur, but where the coercivity/anisotropy is high enough for thermal stability of the recorded bits at the ambient temperature of the disk drive (i.e., the normal operating or "room" temperature of approximately 15-30° C.). In some proposed HAMR systems, the magnetic recording material is heated to near or above its Curie temperature. The recorded data is then read back at ambient temperature by a conventional magnetoresistive read head. HAMR disk drives have been proposed for both conventional continuous media, wherein the magnetic recording material is a continuous layer on the disk, and for bit-patterned media (BPM), wherein the magnetic recording material is patterned into discrete data islands or "bits".

In a typical HAMR write head, light from a laser diode is coupled to a waveguide that guides the light to a near-field transducer (NFT) (also known as a plasmonic antenna). A "near-field" transducer refers to "near-field optics", wherein the passage of light is through an element with subwavelength features and the light is coupled to a second element, such as a substrate like a magnetic recording medium, located a subwavelength distance from the first element. The NFT is typically located at the air-bearing surface (ABS) of the air-bearing slider that also supports the read head and magnetic write pole and rides or "flies" above the disk surface. NFTs are typically formed of a low-loss metal (e.g., Au, Ag, Al, Cu) shaped in such a way to concentrate surface charge motion at a notch or tip located at the slider ABS when light is incident. Oscillating tip charge creates an intense near-field pattern that heats the recording layer on the disk. The magnetic write pole is then used to change the magnetization of the recording layer while it cools. Sometimes, the metal structure of the NFT can create resonant charge motion (surface plasmons) to further increase intensity and disk heating. For example, when polarized light is aligned with an E-antenna type of NFT, an intense near-field pattern is created at the notch or tip of the E-antenna. Resonant charge motion can occur by adjusting the E-antenna dimensions to match a surface plasmon frequency to the incident light frequency. A NFT with a generally triangular output end, sometimes called a "nano-beak" type of NFT, is described in US 2011/0096639 and US 2011/0170381, both assigned to the same assignee as this application. In this type of NFT an evanescent wave generated at a surface of the waveguide couples to surface plasmons excited on the surface of the NFT and a strong optical near-field is generated at the apex of the triangular output end.

In a HAMR disk drive excessive heating of the NFT can cause diffusion of the NFT metal until the NFT tip rounds and recording degrades. One possible cause of failure due to excessive heating may be due to adsorption of carbonaceous material on the slider overcoat near the NFT tip. Hydrocarbon molecules from the disk overcoat and lubricant can become mobile at elevated temperatures and adsorb on the slider ABS. Over time the molecules can form a "smear", which absorbs power from the NFT and becomes very hot. The hot smear wears out the overcoat, and once the overcoat is gone the heat is transferred from the smear to the NFT, resulting in diffusion of the NFT metal until the NFT tip rounds and recording degrades.

Application Ser. No. 14/255,088 filed Apr. 17, 2014 and assigned to the same assignee as this application, describes an optically-transparent protective film in a window region of the recording-layer facing surface of the slider. The window region surrounds both the NFT output end and the write pole end. In one embodiment the overcoat, which is typically diamond-like carbon (DLC), is located between the NFT output end and the protective film. In other embodiments, which preserve the smooth topography of the ABS, there is no overcoat covering the write pole end so only the protective film in the window region protects the write pole end.

What is needed is a HAMR head that has the NFT output end protected from excessive heating and the write pole end protected by the slider overcoat, wherein the slider overcoat retains a smooth topography at the ABS.

SUMMARY OF THE INVENTION

Embodiments of this invention protect the NFT from any heat transfer from hot smear by recessing the NFT from the recording-layer-facing surface of the slider and covering the recessed NFT with an optically-transparent protective film. The NFT is thus separated from the overcoat by the protective film and prevents hot smear near the NFT. However, the write pole end is not recessed and is covered by the overcoat, so there is no spacing loss between the write pole end and the recording layer on the disk. In one embodiment the protective film has a thickness substantially equal to the depth of the recess, which results in the protective film being substantially coplanar with the recording-layer-facing surface of the slider. The overcoat covers both the protective film and the write pole end. In another embodiment, the protective film is thicker than the depth of the recess. The overcoat has a window that surrounds the protective film, with the protective film being substantially coplanar with the outer surface of the overcoat, i.e., the ABS of the slider. In both embodiments the smooth topography of the slider's ABS is maintained.

The protective film is formed of a material transparent to radiation at the wavelength of the laser and has a high index of refraction and low thermal conductivity and is resistant to degradation or corrosion at high temperature and in the presence of oxygen and water. The protective film material is also not comprised primarily of diamond-like carbon (DLC) as this material is not particularly stable at high temperature and in the presence of oxygen. Materials for the protective film include, but are not limited to, $TiO_2$, $ZrO_2$, $HfO_2$, $Nb_2O_5$, $Ta_2O_5$, $Sc_2O_3$, $Y_2O_3$, MgO, SiN, BN, SiBN, SiBNC, with the preferred material being one of $TiO_2$, $ZrO_2$, $HfO_2$, or SiBN.

For a fuller understanding of the nature and advantages of the present invention, reference should be made to the following detailed description taken together with the accompanying figures.

DETAILED DESCRIPTION OF THE INVENTION

Figure 1:
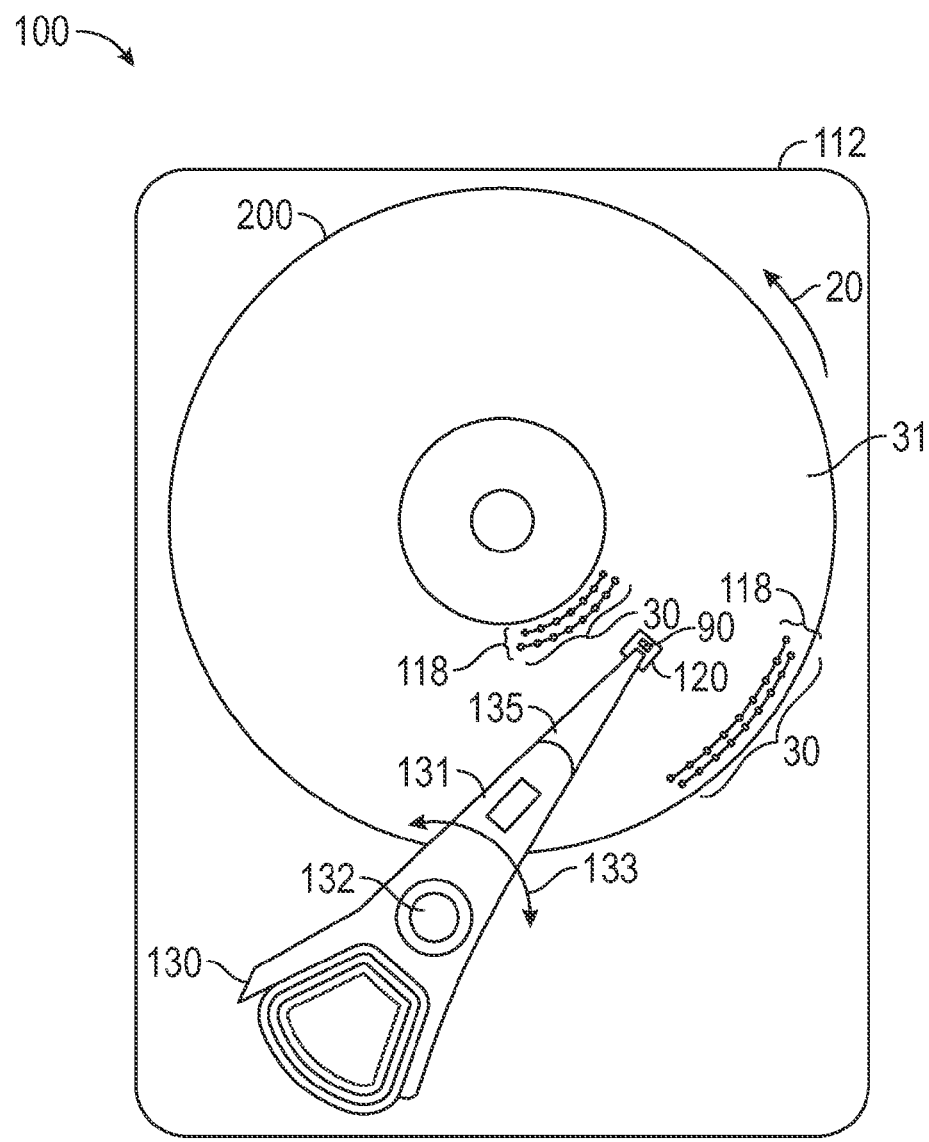
FIG. 1 is a top view of a heat-assisted magnetic recording (HAMR) disk drive according to the prior art.

FIG. 1 is a top view of a heat-assisted magnetic recording (HAMR) disk drive 100 according to the prior art. In FIG. 1, the HAMR disk drive 100 is depicted with a disk 200 with the magnetic recording layer 31 patterned into discrete data islands 30 of magnetizable material arranged in radially-spaced circular tracks 118. Only a few representative islands 30 and representative tracks 118 near the inner and outer diameters of disk 200 are shown. However, instead of the bit-patterned-media (BPM) shown with discrete data islands 30 in FIG. 1, the HAMR disk drive may instead use disks in which the recording layer 31 is a conventional continuous magnetic recording layer of magnetizable material.

The drive 100 has a housing or base 112 that supports an actuator 130 and a drive motor for rotating the magnetic recording disk 200. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as an air-bearing slider 120, attached to the other end of suspension 135. The suspension 135 permits the slider 120 to be maintained very close to the surface of disk 200 and enables it to "pitch" and "roll" on the air-bearing generated by the disk 200 as it rotates in the direction of arrow 20. The slider 120 supports the HAMR head (not shown), which includes a magnetoresistive read head, an inductive write head, the near-field transducer (NFT) and optical waveguide. A semiconductor laser 90, for example with a wavelength of 780 to 980 nm, may be used as the HAMR light source and is depicted as being supported on the top of slider 120. Alternatively, the laser may be located on suspension 135 and coupled to slider 120 by an optical channel. As the disk 200 rotates in the direction of arrow 20, the movement of actuator 130 allows the HAMR head on the slider 120 to access different data tracks 118 on disk 200. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and HAMR head associated with each surface of each disk.

Figure 2:
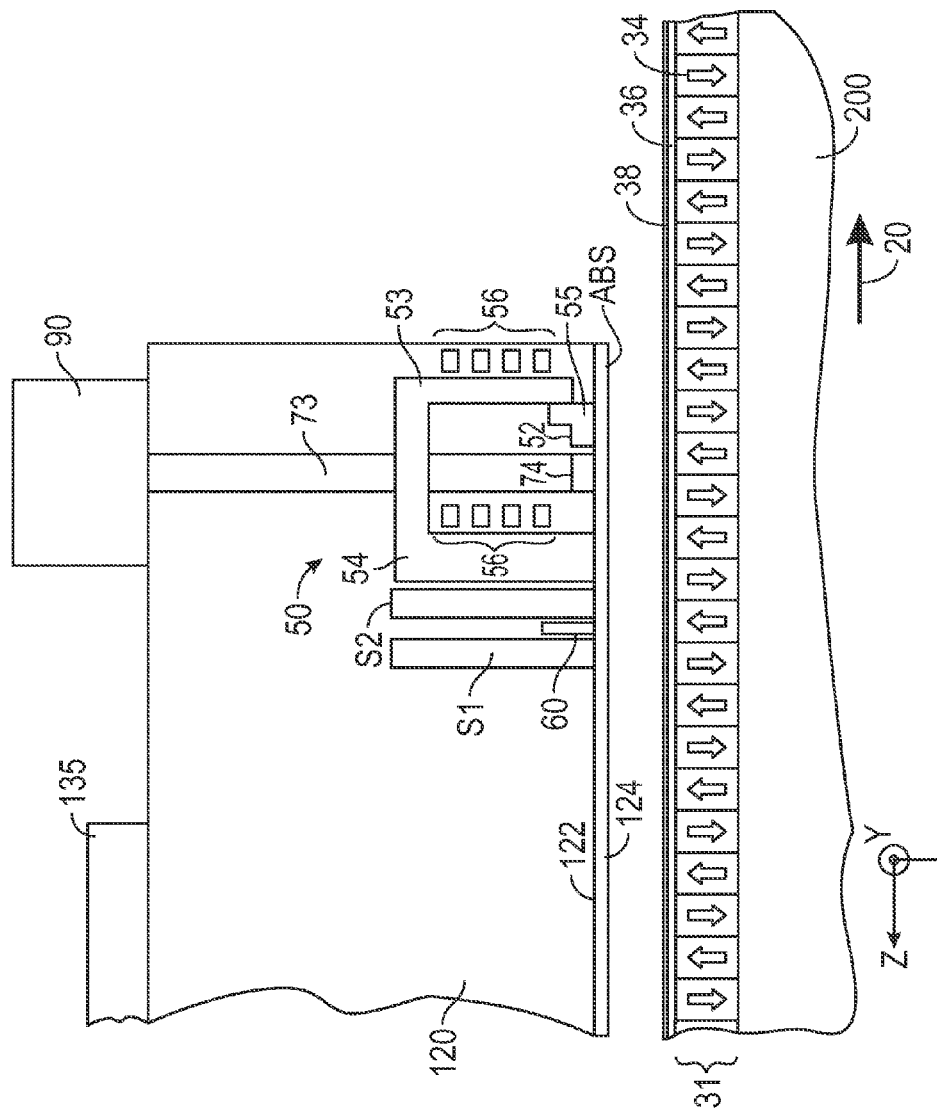
FIG. 2 depicts a sectional view, not drawn to scale because of the difficulty in showing the very small features, of an air-bearing slider for use in HAMR disk drive and a portion of a HAMR disk according to the prior art.

In the following drawings, the X direction denotes a direction perpendicular to the air-bearing surface (ABS) of the slider, the Y direction denotes a track width or cross-track direction, and the Z direction denotes an along-the-track direction. FIG. 2 is a schematic cross-sectional view illustrating a configuration example of a HAMR head according to the prior art. In FIG. 2, the disk 200 is depicted with the recording layer 31 being a conventional continuous magnetic recording layer of magnetizable material with magnetized regions or "bits" 34. The disk includes an overcoat 36, typically formed of amorphous diamond-like carbon (DLC), and a liquid lubricant layer 38, typically perfluoropolyether (PFPE).

The air-bearing slider 120 is supported by suspension 135. The slider 120 has a recording-layer-facing surface 122 onto which an overcoat 124 is deposited. The overcoat 124 is typically a DLC overcoat with a thickness in the range of about 1 to 3 nm and whose outer surface forms the ABS of the slider 120. The slider 120 supports the magnetic write head 50, read head 60, and magnetically permeable read head shields S1 and S2. A recording magnetic field is generated by the write head 50 made up of a coil 56, a main magnetic pole 53 for transmitting flux generated by the coil 56, a write pole 55 with end 52, and a return pole 54. A magnetic field generated by the coil 56 is transmitted through the magnetic pole 53 to the write pole end 52 located near an optical near-field transducer (NFT) 74. The NFT 74, also known as a plasmonic antenna, typically uses a low-loss metal (e.g., Au, Ag, Al or Cu) shaped in such a way to concentrate surface charge motion at a tip located at the slider ABS when light from the waveguide 73 is incident. Oscillating tip charge creates an intense near-field pattern, heating the recording layer 31. Sometimes, the metal structure of the NFT can create resonant charge motion (surface plasmons) to further increase intensity and heating of the recording layer. At the moment of recording, the recording layer 31 of disk 200 is heated by the optical near-field generated by the NFT 74 and, at the same time, a region or "bit" 34 is magnetized and thus written onto the recording layer 31 by applying a recording magnetic field generated by the write pole end 52.

A semiconductor laser 90 is mounted to the top surface of slider 120. An optical waveguide 73 for guiding light from laser 90 to the NFT 74 is formed inside the slider 120. Materials that ensure a refractive index of the waveguide 73 core material to be greater than a refractive index of the cladding material may be used for the waveguide 73. For example, $Al_2O_3$ may be used as the cladding material and $TiO_2$, $Ta_2O_5$ and $SiO_xN_y$ as the core material. Alternatively, $SiO_2$ may be used as the cladding material and $Ta_2O_5$, $TiO_2$, $SiO_xN_y$, or Ge-doped $SiO_2$ as the core material. The waveguide 73 that delivers light to NFT 74 is preferably a single-mode waveguide.

Figure 3:
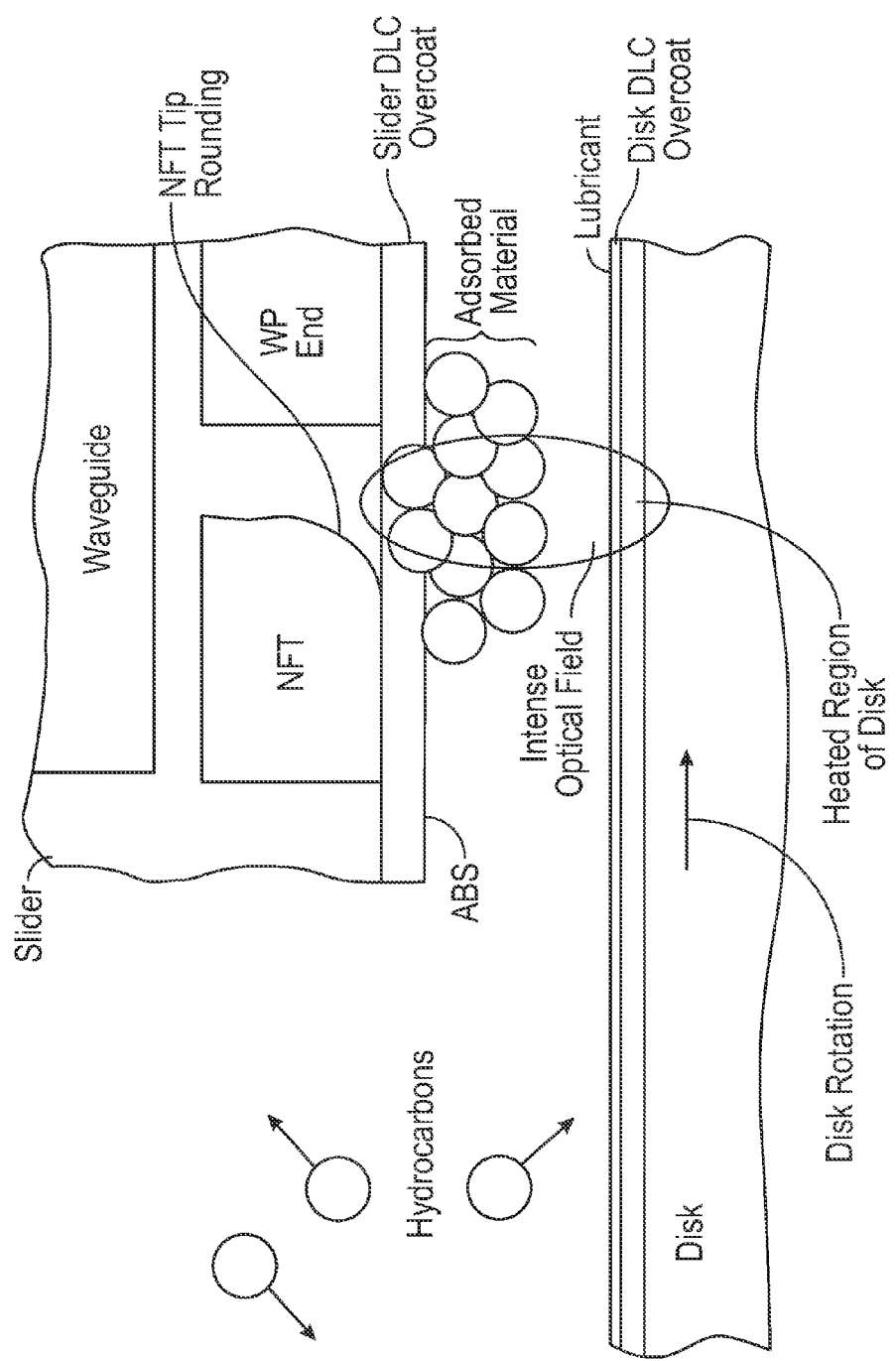
FIG. 3 is a sectional view of portion of the slider with the near-field transducer (NFT) and write pole (WP) end and a portion of the disk with diamond-like carbon (DLC) overcoat and lubricant layer, and illustrating a mechanism for the accumulation of carbonaceous material as a hot "smear" on the overcoat.

In a HAMR disk drive excessive heating of the NFT can cause diffusion of the NFT metal until the NFT tip rounds and recording degrades. One possible cause of failure due to excessive heating may be due to adsorption of carbonaceous material on the DLC overcoat near the NFT tip. This mechanism is illustrated in FIG. 3, which is a schematic showing a portion of the slider with the NFT, write pole (WP) end and DLC overcoat and the disk with DLC overcoat and lubricant layer. Hydrocarbon molecules from the disk overcoat and lubricant can become mobile at elevated temperatures and adsorb on the slider ABS. Over time the molecules can form a "smear", which has been observed in atomic force microscopy (AFM) images. The smear absorbs power from the NFT and becomes very hot. The hot smear wears out the DLC overcoat, and once the DLC overcoat is gone the heat is transferred from the smear to the NFT, resulting in diffusion of the NFT metal until the NFT tip rounds.

Embodiments of this invention protect the NFT from any heat transfer from hot smear by recessing the NFT from the recording-layer-facing surface and covering the recessed NFT with an optically-transparent protective film. The NFT is thus separated from the DLC overcoat by the protective film and prevents hot smear near the NFT. However, the write pole end is not recessed and is covered by the DLC overcoat, so there is no spacing loss between the write pole end and the recording layer on the disk. In one embodiment the protective film has a thickness substantially equal to the depth of the recess, which results in the protective film being substantially coplanar with the recording-layer-facing surface of the slider. The DLC overcoat covers both the protective film and the write pole end. In another embodiment, the protective film is thicker than the depth of the recess. The DLC overcoat has a window that surrounds the protective film, with the protective film being substantially coplanar with the outer surface of the DLC overcoat, i.e., the ABS of the slider.

The protective film is formed of a material different from the material of the slider overcoat. The material of the protective film should have the following properties: 1) transparency to radiation at the wavelength of the laser so additional heat is not generated by the film, 2) a high index of refraction (greater than 1.6) to improve near-field coupling between the NFT and recording layer, 3) low thermal conductivity (less than 10 W/mK) to insulate the NFT from excessive heating, and 4) resistance to degradation or corrosion at high temperature and in the presence of oxygen and water. Additionally, because the protective film is in direct contact with the NFT metal (typically gold or gold alloy) the material should have good adhesion. The protective film material is also not comprised primarily of diamond-like carbon (DLC) as this material is not particularly stable at high temperature and in the presence of oxygen. Materials for the protective film include, but are not limited to, $TiO_2$, $ZrO_2$, $HfO_2$, $Nb_2O_5$, $Ta_2O_5$, $Sc_2O_3$, $Y_2O_3$, MgO, SiN, BN, SiBN or SiBNC, with the preferred material being one of $TiO_2$, $ZrO_2$, $HfO_2$, or SiBN.

Figure 4A:
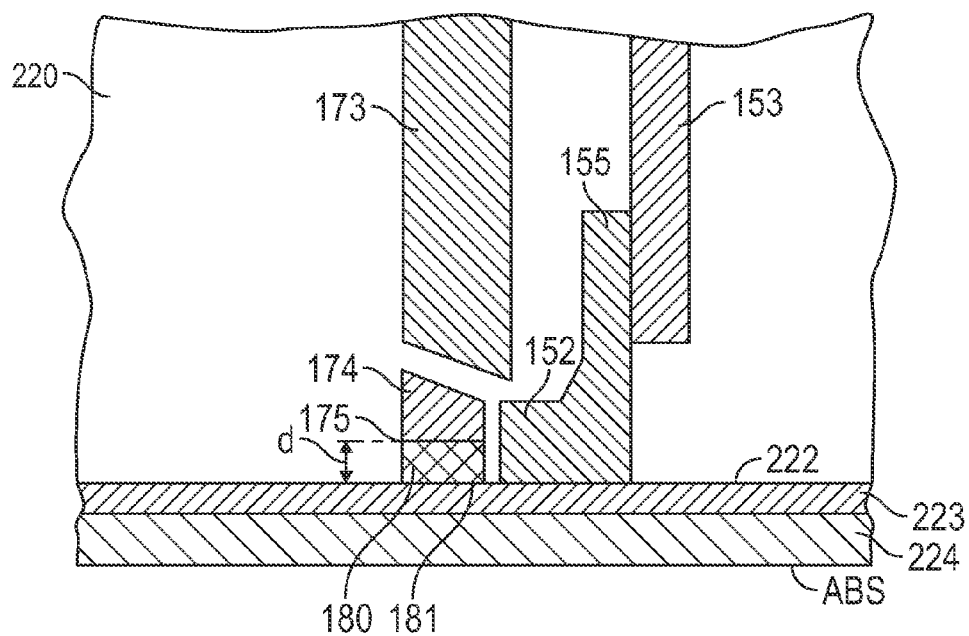
FIG. 4A is a cross-sectional view of a portion of the slider and FIG. 4B is an ABS view of the slider according to an embodiment wherein the protective film has a thickness substantially equal to the depth of a recess in the disk-facing surface, which results in the protective film being substantially coplanar with the disk-facing surface of the slider.
Figure 4B:
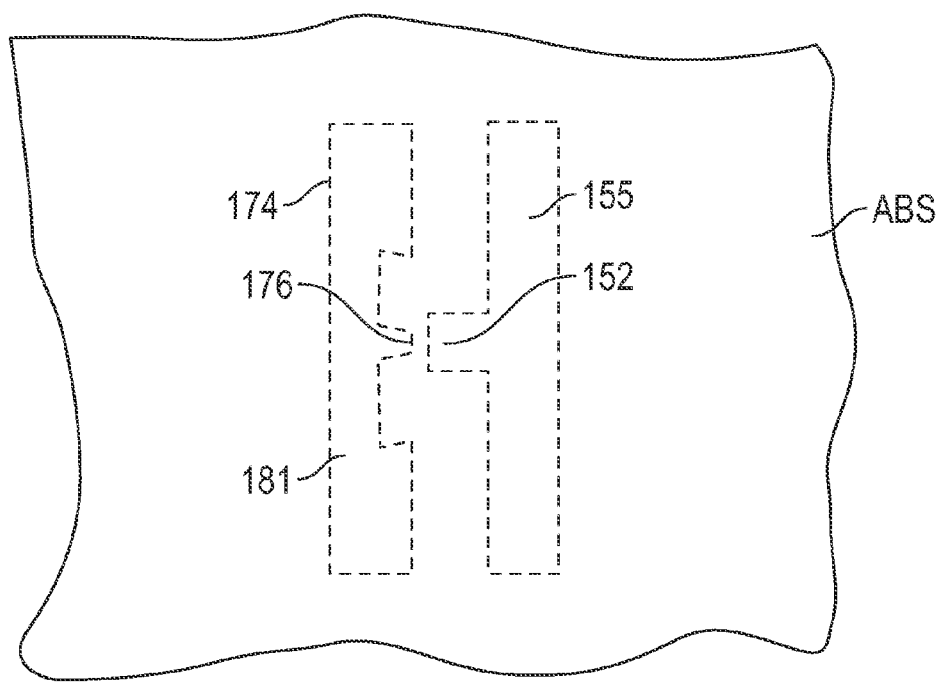

FIG. 4A is a cross-sectional view of a portion of the slider and FIG. 4B is an ABS view of the slider according to one embodiment of the invention. The slider 220 has a surface 222 that faces the recording layer on the disk. The slider supports the waveguide 173, NFT 174, main pole 153 and write pole 155 with write pole end 152. The NFT 174 in this example is an E-antenna with an end 175 having a central tip 176 that faces the write pole end 152 (FIG. 4B). FIG. 4B is a view from the ABS and thus shows both the NFT output end 175 with tip 176 and write pole 155 with lip 152 as dotted lines. The NFT output end 175 is recessed from the disk-facing surface 222 a distance "d", where d is typically between about 1 nm and 10 nm. The recess is filled with a protective film 180 that is in contact with the NFT output end 175. The protective film 180 thus has a thickness substantially equal to "d" and thus protective film surface 181 is substantially coplanar with disk facing surface 222. In this example the write pole end 152 is a lip that extends from the write pole 155 at the disk-facing surface 222. However, the write pole lip 152 is not recessed from the disk-facing surface 222. Because the overcoat 224 (and optional adhesion film 223) directly cover the write pole lip 151 there is no loss of spacing between the write pole lip 152 and the recording layer of the disk, as would be the case if the protective film 180 also covered the write pole lip 152. The outer surface of the overcoat 224 forms the slider's ABS. The embodiment of FIGS. 4A-4B provides the protective film 180 between the NFT output end 175 and the overcoat 224 and protects the write pole lip 152 with the overcoat 224, while maintaining the smooth topography of the ABS.

Figure 5A:
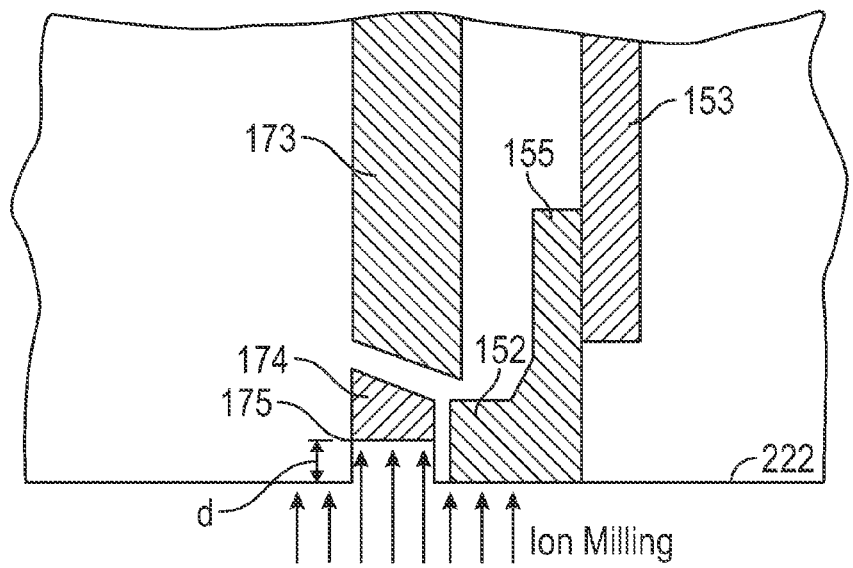
FIGS. 5A-5D are sectional views illustrating one method for making the structure shown in FIGS. 4A-4B.
Figure 5B:
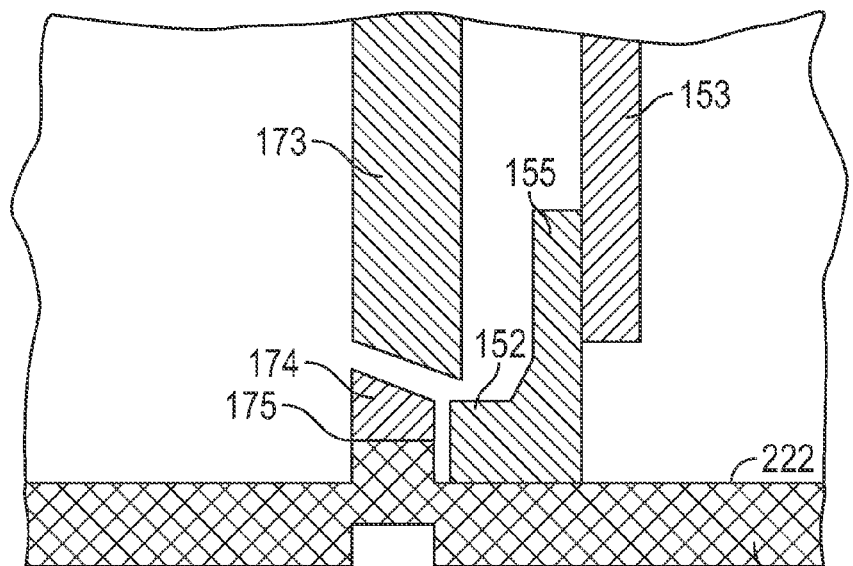
Figure 5C:
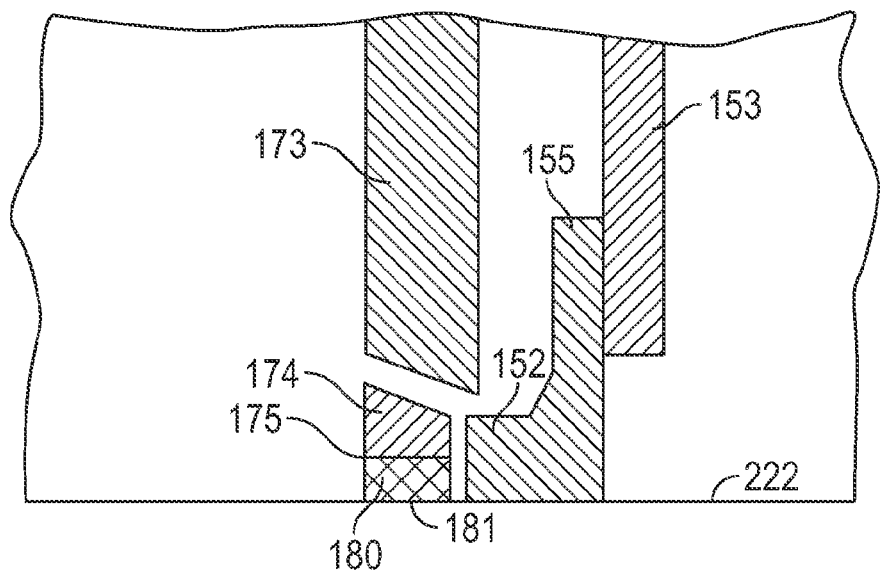
Figure 5D:
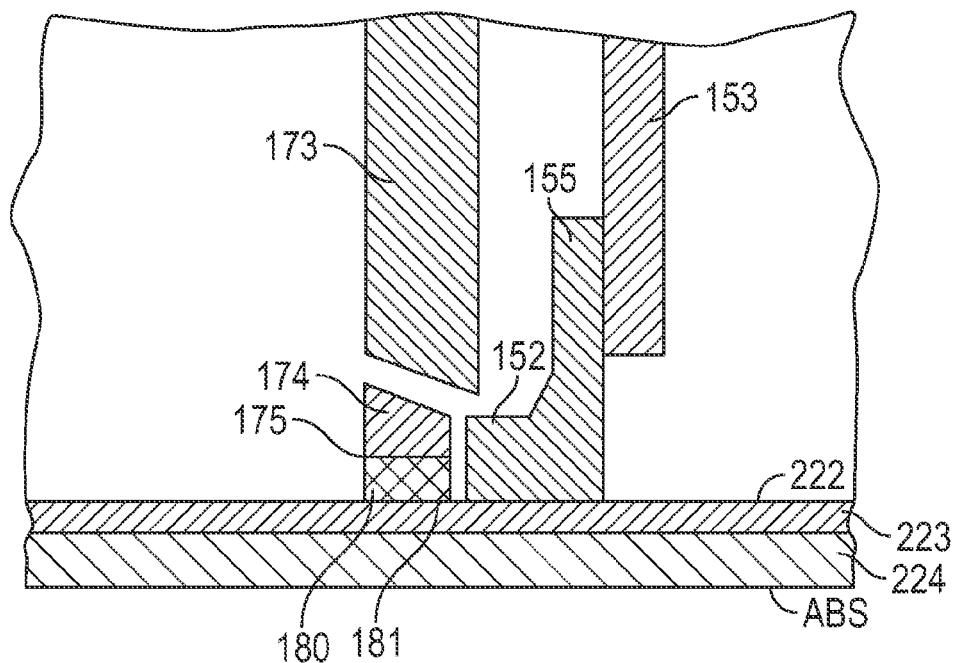

FIGS. 5A-5D are sectional views illustrating one method for making the structure shown in FIGS. 4A-4B. First, in FIG. 5A the disk-facing surface 222 is dry etched, for example by ion milling with Ar+ ions, to etch away the NFT material to the desired depth "d". The NFT material is typically gold, the write pole lip 152 is typically a CoFe or NiFe alloy, and the unshaded regions in FIG. 5A are typically alumina. Because gold has an etch rate about 10 times that of alumina and about 3 times that of CoFe or NiFe, it is possible to ion mill surface 222 without masking, so that the gold NFT is etched away without significant etching of the alumina or write pole lip 152. This defines the recessed end 175 of NFT 174. Next, in FIG. 5B the material of the protective film is deposited, for example by sputtering, onto the disk-facing surface 222 and onto the recessed end 175 of NFT 174 to fill the recess. In FIG. 5C, the excess protective film material is removed, for example by chemical-mechanical polishing (CMP) down to the disk-facing surface 222. This leaves only the protective film 180 in the recess and forms the protective film 180 with surface 181 that is substantially coplanar with disk-facing surface 222. In FIG. 5D, the overcoat 224 (and optional adhesion film 223) are deposited on the disk-facing surface 222 to cover both the protective film 180 and the write pole lip 152.

Figure 6A:
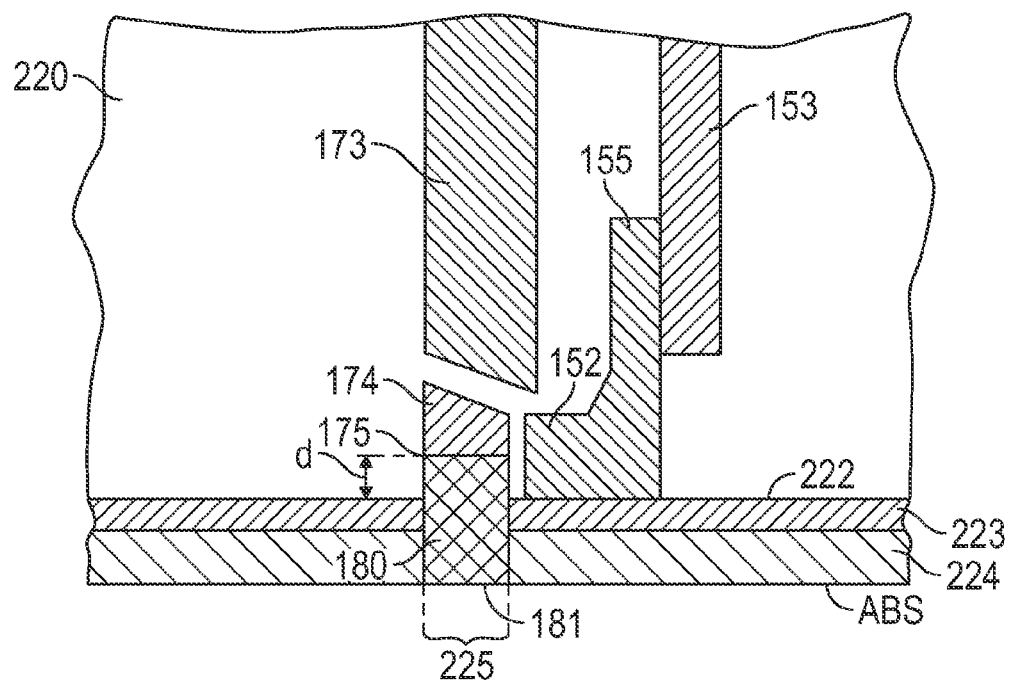
FIG. 6A is a cross-sectional view of a portion of the slider and FIG. 6B is an ABS view of the slider according to another embodiment wherein the overcoat has a window that surrounds the protective film, with the protective film being substantially coplanar with the outer surface of the overcoat.
Figure 6B:
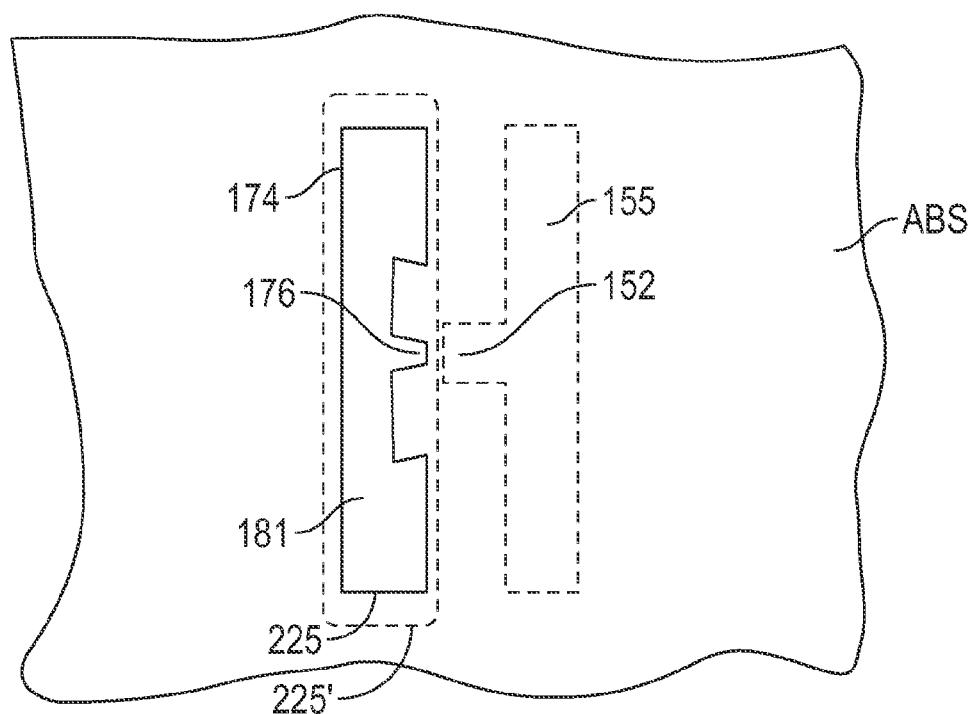

FIG. 6A is a cross-sectional view of a portion of the slider and FIG. 6B is an ABS view of the slider according to another embodiment of the invention. The slider 220 has a surface 222 that faces the recording layer on the disk. The slider supports the waveguide 173, NFT 174, main pole 153 and write pole 155 with write pole end 152. In this embodiment the overcoat 224 includes a window region 225 surrounding the protective film 180. The protective film 180 is within the window region 225 and has a surface 181 substantially coplanar with the outer surface of the overcoat, i.e., the slider's ABS. Like the embodiment of FIG. 4A, the NFT output end 175 is recessed from the disk-facing surface 222 a distance "d", where d is typically between about 1 nm and 10 nm. Both the recess and the window region 225 of the overcoat 224 are filled with the protective film 180 that is in contact with the NFT output end 175. The protective film 180 thus has a thickness substantially equal to "d" plus the thickness of the overcoat 224 (and optional adhesion film 223). Like the embodiment of FIG. 4A, the write pole end 152 is not recessed from the disk-facing surface 222 and thus there is no loss of spacing between the write pole lip 152 and the recording layer of the disk. The outer surface of the overcoat 224 forms the slider's ABS. FIG. 6B is a view from the ABS and shows the protective film outer surface 181 and the outline of the window region 225, which may match the outline of the NFT output end 175. Because the overcoat 224 covers the write pole lip 152, the write pole 155 with lip 152 are shown as dotted lines in FIG. 6B. The window 225 is depicted in FIG. 6B as having the same outline as the shape of the NFT output end 175. However, the window 225 could have other shapes, defined by the lithographic patterning step (FIG. 7B), so long as the window 225 completely surrounds the NFT output end 175 without also overlapping the write pole lip 152. One such window 225' is shown as a generally oval shape surrounding the NFT output end 175. This assures that the NFT output end 175 is completely protected by the protective film 180 and that the write pole lip 152 is covered only by the overcoat 224 so as not to reduce the spacing between the write pole lip 152 and the recording layer on the disk. Like the embodiment of FIGS. 4A-4B, the embodiment of FIGS. 6A-6B also provides the protective film 180 between the NFT output end 175 and the overcoat 224 and protects the write pole lip 152 with the overcoat 224, while maintaining the smooth topography of the ABS.

Figure 7A:
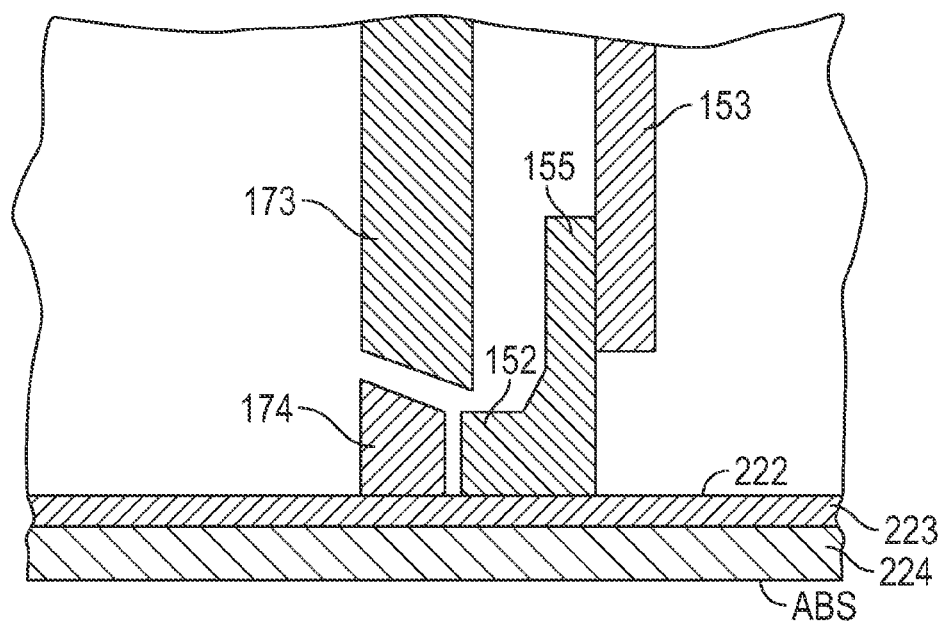
FIGS. 7A-7E are sectional views illustrating one method for making the structure shown in FIGS. 5A-5B.
Figure 7B:
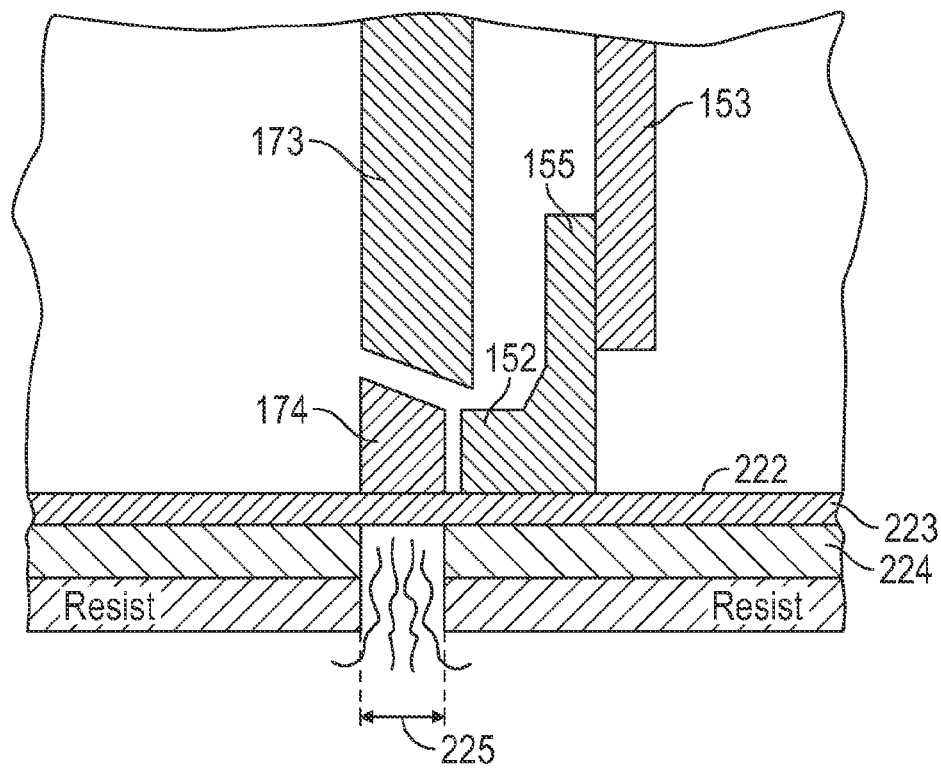
Figure 7C:
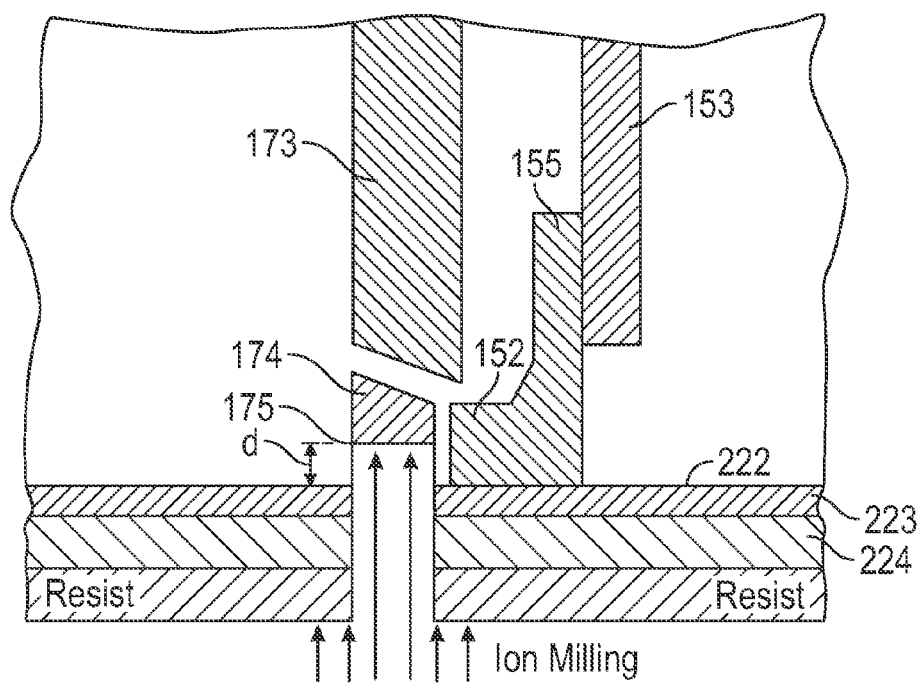
Figure 7D:
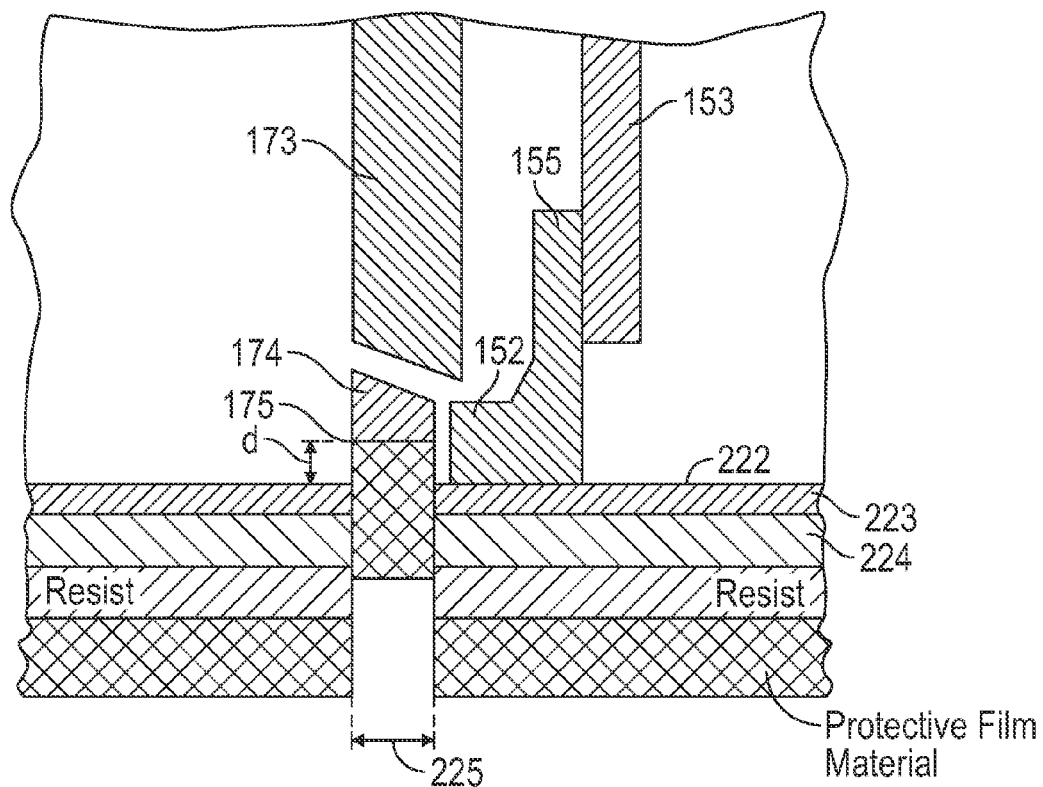
Figure 7E:
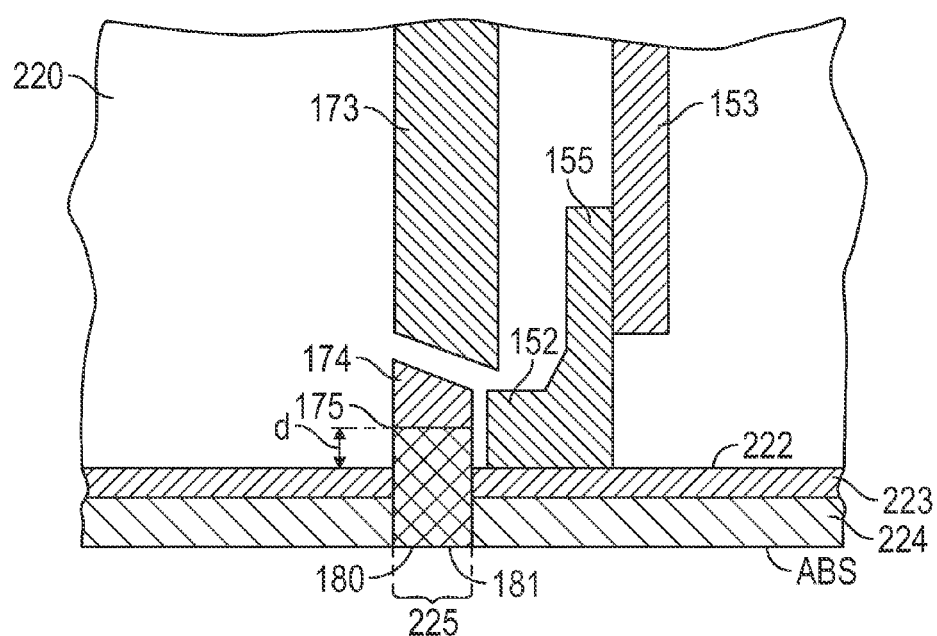

FIGS. 7A-7E are sectional views illustrating one method for making the structure shown in FIGS. 5A-5B. First, in FIG. 7A the overcoat 224 (and optional adhesion film 223) have been deposited on the disk-facing surface 222 to cover both the material of NFT 174 and the write pole lip 152. In FIG. 7B the overcoat 224 has been lithographically patterned with resist to define the opening where the window will be formed, followed by an ashing process with oxygen ions to remove the exposed overcoat 224, which in this example is DLC, to form the window 225. Next, in FIG. 7C an etching process, such as ion milling with Ar+ ions, etches away the NFT material (and the optional adhesion film 223) to the desired depth "d". This defines the recessed output end 175 of NFT 174. Next, in FIG. 7D the material of the protective film is deposited, for example by sputtering or chemical vapor deposition (CVD), into the recess and the window 225 of the overcoat 224. In FIG. 7E the resist has been removed and a CMP process has removed any excess protective film material. This leaves only the protective film 180 in the recess and the window 225 and forms the protective film 180 with an outer surface 181 that is substantially coplanar with the ABS.

Figure 8A:
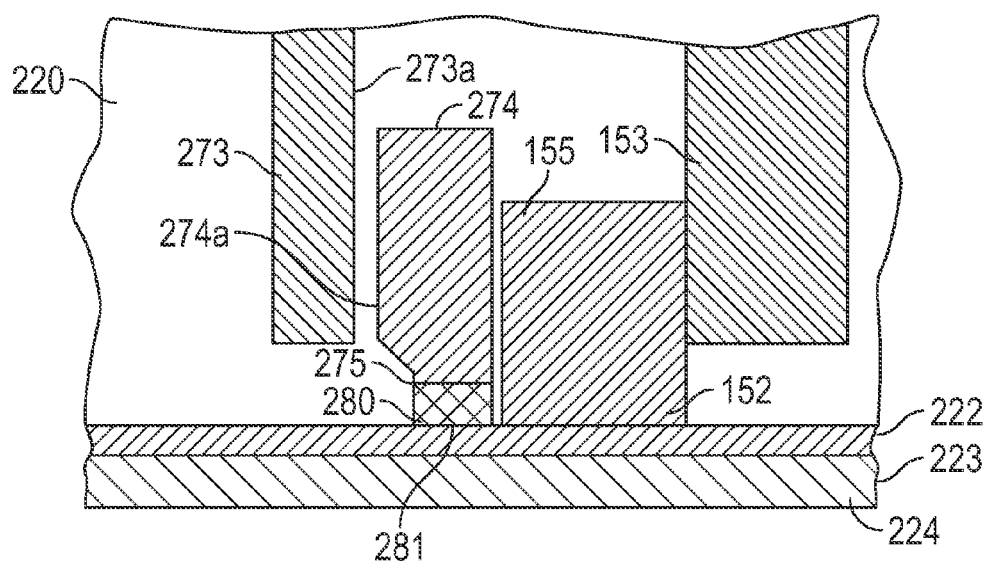
FIG. 8A is a cross-sectional view of a portion of the slider and FIG. 8B is an ABS view of the slider according to an embodiment of the invention wherein the NFT is a "nanobeak" type NFT with a triangular end with an apex of the triangle forming the NFT tip that faces the write pole end.
Figure 8B:
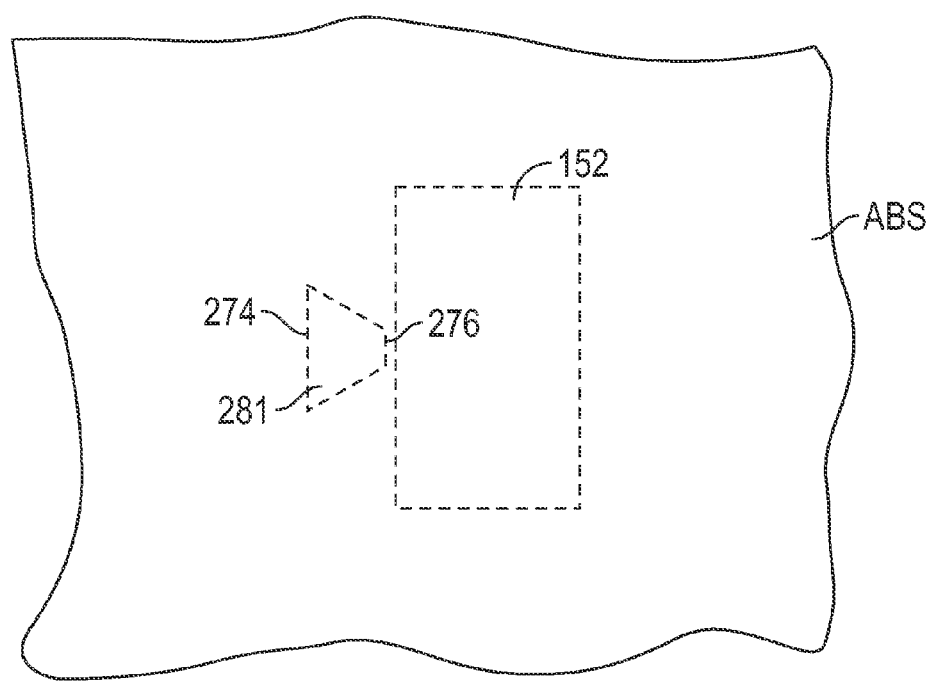

FIGS. 8A-8B illustrate an embodiment wherein the NFT 274 is a "nanobeak" type NFT with a triangular end with an apex of the triangle forming the NFT tip 276 that faces the write pole end 152. In this example, the write pole end 152 does not extend as a lip from the write pole 155. In this type of NFT, the waveguide 273 has a surface 273a that faces a surface 274a of NFT 274. When light is introduced into the waveguide 273, an evanescent wave is generated at the surface 273a and couples to surface plasmons excited on the surface 274a of NFT 274. The surface plasmons propagate to the output tip 276. The nanobeak type of NFT 274 is depicted with the embodiment of FIGS. 4A-4B, but is also applicable to the embodiment of FIGS. 6A-6B.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A heat-assisted magnetic recording (HAMR) head for writing to a magnetic recording layer comprising:
   a head carrier having a recording-layer-facing surface;
   a write pole on the head carrier and having an end at the recording-layer-facing surface;
   an optical waveguide on the head carrier for receipt of laser radiation;
   a near-field transducer (NFT) on the head carrier for optical coupling with the waveguide, the NFT having an output end recessed from the recording-layer-facing surface and facing the write pole end;
   a protective film on the NFT recessed output end between the NFT recessed output end and the recording-layer-facing surface, the protective film being transparent to radiation at the wavelength of the laser; and
   an overcoat on the recording-layer-facing surface and covering the write pole end, the overcoat comprised of a material different from the material of the protective film.

2. The HAMR head of claim 1 wherein the protective film has a thickness substantially the same as the depth of recess of the NFT output end, whereby the protective film has a surface substantially coplanar with the recording-layer facing surface, and wherein the overcoat also covers said protective film.

3. The HAMR head of claim 1 wherein the overcoat includes a window region surrounding the protective film, the protective film being located within said window region and having a surface substantially coplanar with the outer surface of the overcoat.

4. The HAMR head of claim 1 wherein the depth of the recess of the NFT output end is greater than or equal to 1 nm and less than or equal to 10 nm.

5. The HAMR head of claim 1 wherein the protective film is formed of a material selected from $TiO_2$, $ZrO_2$, $HfO_2$, $Nb_2O_5$, $Ta_2O_5$, $Sc_2O_3$, $Y_2O_3$, MgO, BN, SiN, SiBN and SiBNC.

6. The HAMR head of claim 1 wherein the material of the protective film has an index of refraction greater than 1.6.

7. The HAMR head of claim 1 wherein the material of the protective film has a thermal conductivity less than 10 W/mK.

8. The HAMR head of claim 1 wherein the NFT end is an E-antenna having a center output tip facing the write pole end.

9. The HAMR head of claim 1 wherein the NFT end is a nanobeak antenna having a generally triangular shaped output tip with an apex of the triangle facing the write pole end.

10. The HAMR head of claim 1 wherein the overcoat comprises amorphous diamond-like carbon (DLC).

11. The HAMR head of claim 1 wherein the overcoat comprises an adhesion film comprising SiN on the recording-layer-facing surface and an amorphous diamond-like carbon (DLC) layer on the adhesion film.

12. The HAMR head of claim 1 further comprising a magnetoresistive read head on the head carrier.

13. A heat-assisted recording (HAMR) disk drive comprising:
   the HAMR head of claim 1;
   a laser for directing light to the waveguide; and
   a magnetic recording disk having a magnetic recording layer.

14. The HAMR disk dive of claim 13 wherein the magnetic recording layer is patterned into generally concentric tracks containing discrete islands of magnetic material.

15. A heat-assisted magnetic recording (HAMR) head for writing to a magnetic recording layer on a magnetic recording disk comprising:
   an air-bearing slider having a disk-facing surface for facing the magnetic recording layer on the disk,
   a write pole on the slider and having an end at the disk-facing surface;
   an optical waveguide on the head carrier for receipt of laser radiation;

a near-field transducer (NFT) on the head carrier for optical coupling with the waveguide, the NFT having an output tip recessed from the disk-facing surface and facing the write pole end;

a protective film on and in direct contact with the NFT recessed output tip, the protective film having a thickness at least as thick as the depth of recess of the NFT recessed output end from the disk-facing surface, the protective film being formed of a material selected from $TiO_2$, $ZrO_2$, $HfO_2$, $Nb_2O_5$, $Ta_2O_5$, $Sc_2O_3$, $Y_2O_3$, MgO, BN, SiN, SiBN and SiBNC; and an amorphous diamond-like carbon (DLC) overcoat on the disk-facing surface and covering the write pole end, the outer surface of the overcoat forming an air-bearing surface (ABS) of the slider.

16. The HAMR head of claim 15 wherein the protective film has a thickness substantially the same as the depth of recess of the NFT recessed output tip, whereby the protective film has a surface substantially coplanar with the disk-facing surface, and wherein the overcoat also covers said protective film.

17. The HAMR head of claim 15 wherein the overcoat includes a window region surrounding the protective film, the protective film being located within said window region and having a surface substantially coplanar with the outer surface of the overcoat.

18. The HAMR head of claim 15 wherein the material of the protective film has an index of refraction greater than 1.6 and a thermal conductivity less than 10 W/mK.

19. The HAMR head of claim 15 wherein the NFT is selected from an E-antenna having a center output tip facing the write pole end and a nanobeak antenna having a generally triangular shaped output tip with an apex of the triangle facing the write pole end.

\* \* \* \* \*